(12) United States Patent
Spencer et al.

(10) Patent No.: US 10,562,008 B2
(45) Date of Patent: Feb. 18, 2020

(54) SELECTIVE REMOVAL OF BENZENE FROM SPENT SULFUR ABSORBENTS

(71) Applicant: Clariant Corporation, Louisville, KY (US)

(72) Inventors: Jason E. Spencer, Corydon, IN (US); Gabrielle C. Ferrer, Louisville, KY (US); Tobias A. Henkel, Louisville, KY (US)

(73) Assignee: CLARIANT CORPORATION, Louisville, KY (US)

(*) Notice: Subject to any disclaimer, the term of this patent is extended or adjusted under 35 U.S.C. 154(b) by 0 days.

(21) Appl. No.: 16/166,249

(22) Filed: Oct. 22, 2018

(65) Prior Publication Data

US 2019/0118163 A1    Apr. 25, 2019

Related U.S. Application Data

(60) Provisional application No. 62/576,706, filed on Oct. 25, 2017.

(51) Int. Cl.

| | |
|---|---|
| *B01J 20/34* | (2006.01) |
| *B01J 20/18* | (2006.01) |
| *B01J 20/30* | (2006.01) |
| *B01D 53/02* | (2006.01) |
| *C10L 3/10* | (2006.01) |
| *B01J 20/16* | (2006.01) |
| *B01J 20/02* | (2006.01) |

(52) U.S. Cl.
CPC .......... *B01J 20/3408* (2013.01); *B01D 53/02* (2013.01); *B01J 20/0237* (2013.01); *B01J 20/165* (2013.01); *B01J 20/18* (2013.01); *B01J 20/3085* (2013.01); *B01J 20/3458* (2013.01); *B01J 20/3466* (2013.01); *B01J 20/3475* (2013.01); *C10L 3/103* (2013.01); *B01D 2253/108* (2013.01); *B01D 2257/30* (2013.01); *B01D 2259/40086* (2013.01); *C10L 2290/542* (2013.01)

(58) Field of Classification Search
CPC ........ B01J 20/34; B01J 20/3408; B01J 20/18; B01J 20/3085; B01J 20/3466; B01D 53/02; B01D 2253/108; B01D 2257/30; B01D 2259/40086; C10L 3/103
USPC ........................................... 502/55
See application file for complete search history.

(56) References Cited

U.S. PATENT DOCUMENTS

| | | |
|---|---|---|
| 6,843,907 B1 | 1/2005 | Kanazirev et al. |
| 7,094,333 B2 | 8/2006 | Yang |
| 7,517,389 B2 | 4/2009 | Van De Graaf |

OTHER PUBLICATIONS

Velu, Xiaoliang and Song in "Mechanistic Investigations on the Adsorption of Organic Sulfur Compounds Over Solid Adsorbents in the Adsorptive Desulfurization of Transportation Fuels", Am. Chem. Soc., Div. Fuel Chem. 2003, 48(2), 393.
Hernandez-Maldonado, Arturo J. "New Sorbents for Desulfurization of Diesel Fuels via [pi] Complexation: Layered Beds and Regeneration" Ind. Eng. Chem. Res. 43 (2004) 769-776.

*Primary Examiner* — Edward M Johnson

(57) ABSTRACT

As an improvement to processes for desulfurization of natural gas and synthetic natural gas streams that employ conventional zeolitic materials (absorbents), including copper-containing zeolites, pre-treatment methods and post-treatment methods are provided that lower the level of leachable benzene following desulfurization with the absorbents to <0.5 mg benzene/L leachate, while retaining within the absorbents a majority of sulfur adsorbed from a gas stream.

17 Claims, 4 Drawing Sheets

SELECTIVE REMOVAL OF BENZENE FROM SPENT SULFUR ABSORBENTS

CROSS REFERENCE TO RELATED U.S. APPLICATION

This patent application claims the benefit of priority to U.S. provisional patent application Ser. No. 62/576,706 with a filing date of Oct. 25, 2017, the full contents of which are fully incorporated herein by reference in their entirety.

FIELD OF INVENTION

Present embodiments address and solve a significant problem related to desulfurizing gas streams by adsorption onto absorbents (including without limitation zeolitic material), by virtue of reducing benzene levels that would otherwise be contained on the absorbents.

BACKGROUND

Natural gas, a source of hydrogen fuel, is a colorless and odorless combustible gas, and it provides an abundant fuel source that is commonly used in stationary fuel cell applications. Practical uses of fuel cells range from stationary industrial power supplies to portable power for consumer electronics. In many parts of the world, natural gas and synthetic natural gas (collectively, "natural gas") are made available through an extensive pipeline distribution network that delivers the fuel to homes and businesses, including fuel cell manufacturers. Any leak in this pipeline network may pose a significant risk of gas accumulating to explosive levels without detection.

To reduce this risk, odorants are added to the natural gas which allows individuals to detect natural gas leaks without any equipment. The most common odorants used are sulfur compounds that have odors similar to rotten eggs or cabbage. These compounds vary by region, but typical examples include: mercaptans, sulfides, disulfides, thiophenic compounds and other organic or inorganic sulfur compounds. Problematically, the sulfur in such sulfur-containing compounds is a poison to most reforming and low temperature shift catalysts commonly found upstream of fuel cells, as well as most fuel cells themselves. Thus, it is necessary to remove the sulfur odorants at a point in the process before the natural gas is used as fuel for the fuel cell.

Two types of desulfurization are commonly used for fuel cell applications: ambient temperature and hot (typically 200-400° C.) desulfurization. In ambient temperature desulfurization, absorbents such as zeolites are often used to remove sulfur compounds primarily by physisorption. Chemisorption can occur on zeolitic materials for some compounds, such as hydrogen sulfide ($H_2S$), but to a lesser extent compared to the physisorption. As these zeolitic materials remove compounds primarily based on size and shape of the molecules, they also remove hydrocarbons from the gas stream in addition to the sulfur-containing compounds. This is of little consequence for most of the hydrocarbon compounds, with the noted exception of benzene. This is a particular concern in many countries, including in the U.S., where the spent absorbent must be disposed as hazardous waste if the absorbent leaches >0.5 mg benzene/L of leachate as defined by the Environmental Protection Agency's (EPA) Toxicity Characteristic Leaching Procedure (TCLP). For fuel cell applications, the benzene not captured by the absorbent is normally reformed or oxidized depending on the application. Thus, only the benzene trapped on the absorbent is of concern.

Accordingly, present embodiments improve processes for desulfurization of natural gas, including ambient temperature desulfurization, which include those processes that use conventional zeolitic materials as absorbents. The improvements lower the level of leachable benzene at end of life (EOL) of the absorbent to <0.5 mg benzene/L leachate, while retaining the majority of sulfur adsorbed onto the zeolites. In this regard, present embodiments utilize the differences in binding strength and binding mechanisms for the relevant sulfur compounds and benzene. For example, one prior study reported findings on nonaromatic and saturated aromatic organosulfur compounds adsorbed on ion-exchanged zeolites (including Cu—Y zeolite). Velu, Xiaoliang and Song in "Mechanistic Investigations on the Adsorption of Organic Sulfur Compounds Over Solid Adsorbents in the Adsorptive Desulfurization of Transportation Fuels", Am. Chem. Soc., Div. Fuel Chem. 2003, 48(2), 693. The authors observed that the mechanism of adsorption tends to occur by metal sulfur (M-S) interactions, whereas benzene is adsorbed by weaker π-complexation. In particular, the study pointed out that non-saturated aromatic sulfur compounds such as thiophene tended to bind to the zeolites either by direct M-S interaction or π-complexation. A recognition that such differences exist between sulfur compounds and benzene has advantageously and unexpectedly led to strategies for blocking, displacing or otherwise removing a substantial amount of benzene from used or spent absorbents.

SUMMARY OF EMBODIMENTS

Absorbents are required to remove sulfur odorants from pipeline natural gas for use in fuel cell operations, as these sulfur compounds are poisons to many catalysts and fuel cells. However, benzene also can accumulate on these absorbents during operation, requiring end of life disposal as hazardous waste. Accordingly, embodiments provided herein allow the in-situ selective removal of benzene from these absorbents, thus promoting compliance with EPA limits for disposal of used or spent sulfur absorbents as non-hazardous waste, in accordance with the Toxicity Characteristic Leaching Procedure (TCLP).

The strategies used in selective removal of benzene from sulfur absorbents will vary based on circumstances. In general, though, benzene content in used or spent absorbents has been lowered through various mechanisms, including: extraction, in which a solvent (e.g., benzyl alcohol, methanol) dissolves benzene and transports it away during evaporation; displacement, in which a compound (e.g., sulfur compounds described herein, water) that bonds directly with copper found in the absorbent displaces the benzene molecules; or reaction, in which a compound reacts with the copper, liberating the benzene as it pulls the copper from the zeolite cages (e.g., benzaldehyde and butyraldehyde.)

According to multiple embodiments and alternatives described herein, the purpose of the post-treatment (i.e., following desulfurization, just before or after removal of the absorbents from the reactor) of sulfur absorbents will dictate the selection of strategy in terms of which compound/mechanism is preferred. For example, there are scenarios in which very low leachable benzene (TCLP benzene) levels are required, coupled with little to no concern of corrosion or poisoning of the absorbent because it will not be reused. Such factors would tend to increase the effectiveness of benzaldehyde, for example, as a potentially viable post-treatment option. By comparison, given the objective of reducing the TCLP benzene to <0.5 mg/L leachate without corroding or poisoning the zeolite absorbents, water in both the liquid and gaseous phases is a suitable post-treatment compound, and provides the further advantage that it is an environmentally benign substance.

Accordingly, there are provided in some embodiments a pre-treatment method, which expose the absorbents to agents that are not classified as toxic, which interact chemically with the absorbents via the same π-complexation mechanism as benzene. The chemical interactions thereby serve to block benzene from chemical interaction between electrons of π-orbitals of aromatic benzene and metal contained in the absorbents.

Additionally, according to some embodiments, a post-treatment method practiced upon the absorbents displaces at least a portion of the benzene attracted to the absorbents due to chemical interaction between electrons of π-orbitals of aromatic benzene and metal contained in the absorbents. In some embodiments, the displacement of benzene is selective in that the agents that displace benzene from the absorbents do not in turn displace—or these agents only minimally affect the binding of—other molecules and compounds that have bonded to or interacted with the absorbents, such as sulfur compounds.

Pre-treatment refers to exposing and applying to the absorbents one or more agents before use and under the conditions described, either in-situ or ex-situ relative to the reactor in which the absorbents are installed according to known techniques. In the reactor, the absorbents are then contacted with a particular gas stream, such as pipeline natural gas, in which the natural gas contains sulfur compounds and aromatic hydrocarbons such as benzene. Conversely, post-treatment refers to exposing and applying to the absorbents either in-situ or ex-situ, one or more agents under the conditions described herein after the absorbents have been removed from service or prior to their reuse. For pre-treatment and post-treatment, treating of the absorbents in-situ (while in the reactor) is preferred, but both forms of treatment also can occur outside the reactor where desulfurization occurs.

In some embodiments, one or more agents used for pre-treatment or post-treatment is diluted, e.g., with methanol. Additionally, in some embodiments one or more pre-treatment steps and one or more post-treatment steps as described herein are practiced sequentially upon the same absorbents.

Also, there are provided herein certain embodiments in which pre-treatment is used on one region of an absorbent bed, while post-treatment is used on a different region of the same absorbent bed. In this regard, according to some embodiments, as selected by a user, pre-treatment is used upon absorbents making up an absorbent bed and positioned more proximal to the inlet of the bed, because regions of the absorbent bed closer to the inlet see higher concentrations of sulfur compounds in the gas stream.

Additionally, according to at least one embodiment, the methods of pre-treatment or post-treatment, or both, as described herein are utilized on an absorbent bed that will be reused. Alternatively, any of these methods are practiced upon an absorbent bed that has reached its end of life and will not be reused.

BRIEF DESCRIPTION OF FIGURES

The embodiments described and claimed herein will be further understood in view of the following figures, which are intended as illustrative only.

MULTIPLE EMBODIMENTS AND ALTERNATIVES

Present embodiments are directed to removal of benzene from absorbents that are used in the desulfurization of natural gas fuels. Sulfurization enables the detection of leaks of natural gas pipelines, but the sulfur content must be removed prior to any use of the natural gas, such as in a fuel cell. However, the conventional absorbents used in removing the sulfur from natural gas also trap carbon compounds—including benzene. Benzene is a hazardous substance and must be lowered below specified levels on the absorbent before the absorbent can be disposed of as a non-hazardous material.

Sulfur and Benzene Loading Profiles

Figure 1:
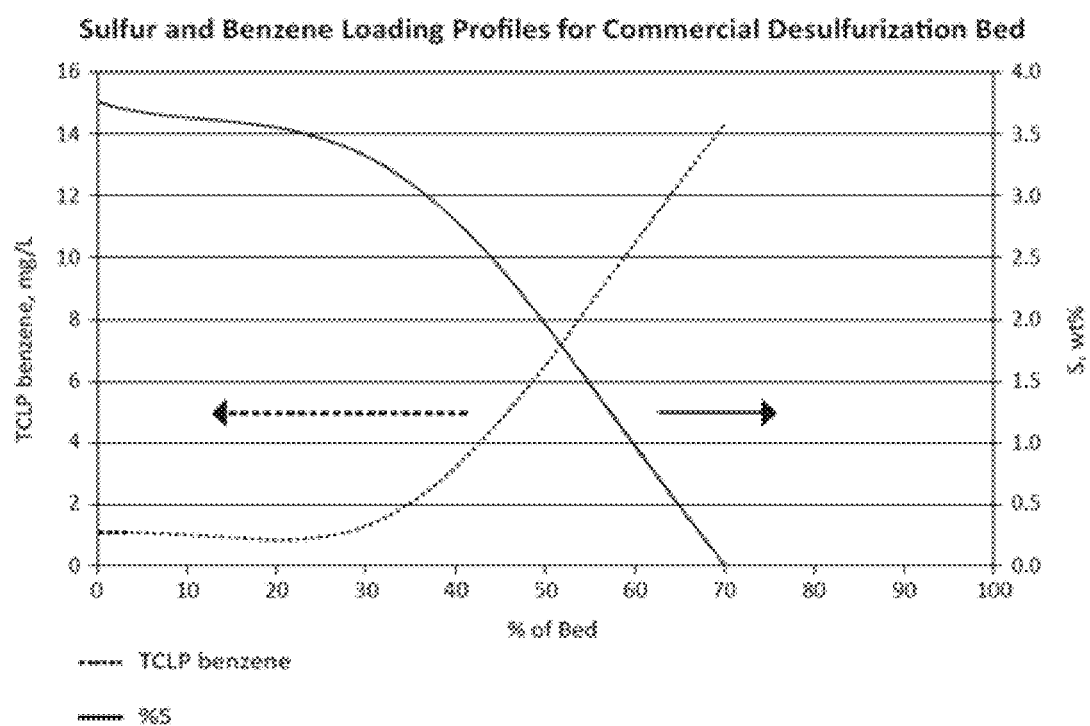
FIG. 1 is a graph of sulfur and benzene loading profiles for a commercial desulfurization bed comprising absorbents.

As illustrated in FIG. 1, a typical benzene and sulfur profile for a commercial absorbent bed in which the absorbents are spent reflects an inverse relationship between the absorption of benzene and sulfur compounds from a stream of natural gas. Moving from left to right along the horizontal axis of the figure, the bed inlet is 0% of the bed (i.e., a point at which the gas stream has not yet traversed any portion of the bed) and the bed outlet is 100% of the bed (i.e., the point at which the gas stream has traversed the entire bed). Herein, a commercial absorbent bed is any of many types that are available from manufacturers in this country and internationally. While not meant as limiting, an example of such a commercial absorbent bed (as used in the examples contained herein) comprises a Cu—Y zeolite with about 7-13% copper oxide with much of the balance as aluminosilicate zeolite, with trace amounts (<1,000 ppm) of calcium, iron, and titanium. Such absorbents may have a density of about 0.55 kg/L, a hardness rating of at least about 15 N, and an extruded particle size of about 1-10 mm, of which 1.6 mm particle size has been used in some embodiments.

In operation with such an absorbent bed, total carbon throughout the bed generally is fairly consistent, at about 7-10% wt. Looking at the two curves (one for TCLP benzene and the other for % S), FIG. 1 illustrates that the amount of total sulfur becomes more concentrated at the bed inlet and decreases moving through the bed, while the amount of TCLP benzene is lowest at the bed inlet and increases moving through the bed.

Figure 2:
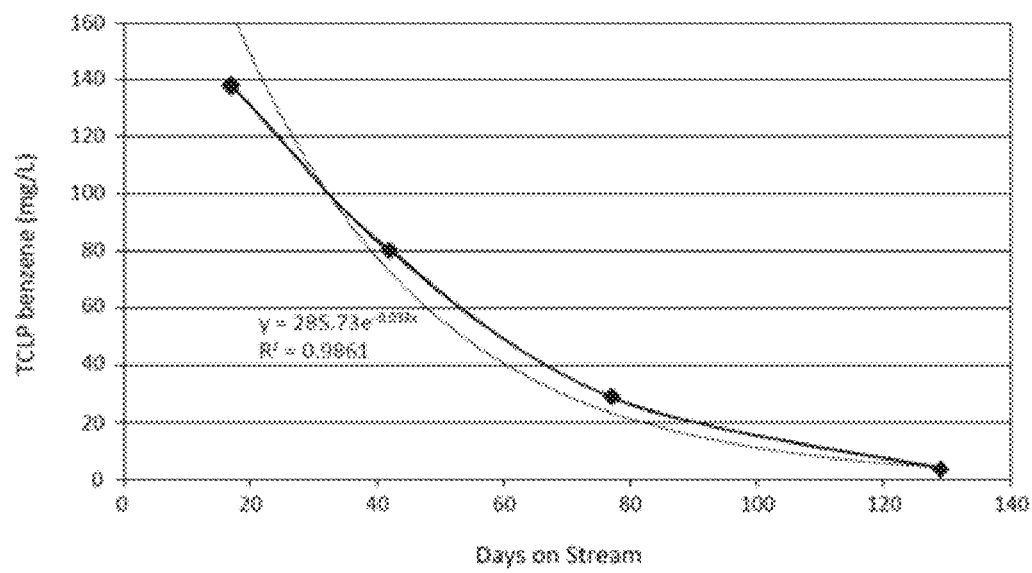
FIG. 2 is a graph of TCLP benzene levels as a function of time on stream with respect to a desulfurization bed as discussed for FIG. 1.

FIG. 2 is a graph of TCLP benzene levels as a function of time on stream. The test conditions were performed at ambient temperature and atmospheric pressure, and a GHSV of 450 hr$^{-1}$. A feed gas comprising Pipeline natural gas (~2.5 ppm tBM (tertiary butyl mercaptan), ~1 ppm DMS (dimethyl sulfide), ~1 ppm $H_2S$, 30-80 ppm benzene) was run over a 40 mL bed volume. For the data in FIG. 2, absorbent samples were analyzed at different times on stream (i.e., resulting in different sulfur concentrations). It is seen that TCLP benzene is highest early in the run as the sulfur concentration is low. With time on stream, the sulfur concentration increases and the TCLP benzene decreases at a seemingly exponential rate from 139 to 3.8 mg/L of leachate by 129 days on stream in this figure.

Binding Strength and Binding Mechanisms

Present embodiments recognize that the binding strength and binding mechanisms relative to metal-containing absorbents are different for most sulfur compounds compared to benzene. For example, many sulfur compounds exhibit direct metal-sulfur (M-S) bonding. Conversely, benzene is held primarily by π-complexation between the metal and the electrons in the ring, with the M-S interaction being stronger than the π-complexation. Accordingly, in some embodiments pre-treatment steps (before absorbents are exposed to a natural gas stream) are provided to block benzene from interacting with the absorbents. In other embodiments, post-treatment steps occur before or after the absorbents are removed from the reactor having been exposed to a natural gas stream, and are provided to selectively displace benzene from the absorbents while retaining the adsorbed sulfur compounds. That is, for the latter it is possible to displace the benzene with molecules that adsorb more strongly or by a different mechanism compared to benzene, such as direct metal bonding. For example, a post-treatment step is the selective reaction using one or more agents described herein that targets the metal-benzene π-complex to displace benzene, while the M-S bonds are minimally affected. This route achieves very low benzene levels throughout the bed but requires the use of organic compounds.

Accordingly, in some embodiments a method is provided to lower benzene levels in absorbents that are used for desulfurization of a gas flow in a reactor having an inlet and an outlet. The steps include applying at least one agent to the absorbents, wherein the absorbents are aluminosilicate zeolites having a structure that contains at least one metal, which can be copper. The agents displace a large amount of the benzene that has interacted with the metal of the zeolite. In some embodiments, the at least one agent is benzyl alcohol, benzaldehyde, methanol, diethyl ether, or mixtures thereof. In some embodiments, the weight percentage of the at least one agent is about 30% to about 60%, and more particularly in some instances about 40% to about 50%. In the case of benzyl alcohol, the weight percentage may range from about 10% to about 50%.

In some embodiments, the at least one agent is water, at a weight percentage of about 1% to about 60%, preferably about 10% to about 50%. In some embodiments, the treatment uses water in a liquid phase applied with a sprayer. Alternatively, the water that is used is in a gaseous phase and applied as a hydrated gas stream.

In some embodiments, these methods as disclosed herein are performed at ambient temperature. Alternatively, these methods are performed at a temperature no greater than about 100° C.

Pre-Treatment

Accordingly, in some embodiments, pre-treatment occurs before desulfurization of a gas stream using absorbents and refers to the pre-adsorption of compounds by the absorbents to block benzene. Data on tests conducted indicated that certain compounds can be pre-adsorbed onto an absorbent to block the benzene, while still allowing sulfur adsorption by the absorbent. The compounds studied included those ranging from water to aromatic compounds with various functional groups. Pre-adsorption was accomplished by incipiently wetting the absorbent with the desired pre-adsorbate (20-50% wt). The pre-treated samples were then evaluated in natural gas for sulfur and benzene adsorption.

In some experiments, comparative data indicated that unsaturated aromatics (e.g., ρ-xylene) were able to block benzene better than saturated aromatics (e.g., cyclohexane), but neither was effective enough to allow the spent absorbent to be disposed as non-hazardous waste at end of life (EOL). For aromatic compounds with different functional groups, it was found that unsaturated aromatic aldehydes (e.g., benzaldehyde) and unsaturated alcohols (e.g., benzyl alcohol) were preferred over ρ-xylene and cyclohexane, respectively, to prevent or limit benzene adsorption, <0.1 mg benzene/L leachate. However, both of these aromatic compounds also negatively affected the adsorption of sulfur as well. Therefore, benzaldehyde was diluted with methanol and applied to the absorbent to achieve 1% wt benzaldehyde. This returned only some of the sulfur capacity and the benzene blocking was also diminished. Even so, this is not to say that benzaldehyde is not useful as a treatment agent according to present embodiments, and further the interaction observed between the absorbent and benzaldehyde led to other insights which are discussed below. Water and diethyl ether also were evaluated as agents for pre-treatment, with diethyl ether showing stronger adsorption than water. However, at some levels (wt %), these were not indicated to have interactions with the absorbent strong enough to prevent benzene adsorption.

The following descriptions by way of examples are intended to provide relevant and illustrative information pertaining to possible embodiments of the present invention. No limitation of the breadth and scope of the overall invention is to be construed by any examples provided herein except as specifically recited in the claims.

The following tables show the TCLP benzene results at different GHSV and bed volume for various compounds.

TABLE 1

| Treatment Agent | Loading, wt % | TCLP benzene, mg/L leachate |
|---|---|---|
| Untreated | N/A | 13.00 |
| Cyclohexane | 36 | 7.86 |
| ρ-Xylene | 46 | 2.58 |
| Benzaldehyde | 47 | 0.07 |
| Benzaldehyde | 1.0 | 9.78 |

Test Conditions:
Temp = Ambient
Pressure = 5 pounds per square inch gauge (psig)
Bed volume = 10 mL
GHSV = 10,000 hr$^{-1}$
Feed Gas = Pipeline natural gas (~2.5 ppm tBM, ~1 ppm DMS, ~1 ppm H$_2$S, 30-80 ppm benzene).

The value for weight percentage (wt %) for the treatment agents in the experiments described herein was calculated based on the ratio of the weight of the agent over the weight of the absorbents in the reactor.

TABLE 2

| Sample | Loading, wt % | TCLP benzene, mg/L leachate |
|---|---|---|
| Untreated | N/A | 3.13 |
| Water | 48 | 3.06 |

TABLE 2-continued

| Sample | Loading, wt % | TCLP benzene, mg/L leachate |
|---|---|---|
| Diethyl ether | 50 | 1.93 |
| Benzyl alcohol | 41 | 0.01 |

Test Conditions:
Temp = Ambient
Pressure = 5 psig
Bed volume = 20 mL
GHSV = 8500 hr$^{-1}$
Feed Gas = Pipeline natural gas (~2.5 ppm tBM, ~1 ppm DMS, ~1 ppm H$_2$S, 30-80 ppm benzene)

The bed volume and gas hourly space velocity (GHSV) are different between the data sets shown in Table 1 and Table 2, which causes the TCLP benzene level for the untreated absorbents to be different in the two tables. This is consistent with lower benzene levels being found when sulfur levels are higher. In other words, more sulfur is adsorbed by the absorbents at lower GHSV, which corresponds to lower TCLP benzene levels in Table 2, compared to the results in Table 1 for higher GHSV.

Post-Treatment

Post-treatment refers to steps taken to affect the absorbents following desulfurization of the gas stream. As with the pre-treatment evaluation, data was collected on several of the compounds in the context of post-treatment. Criteria for viability include the extent to which a compound lowers overall TCLP benzene to <0.5 mg/L, while allowing the absorbent to retain most of the sulfur absorbed. It has been observed that sulfur concentration in the gas stream decreases moving from the inlet to the outlet of the bed, while the benzene level increases moving from the inlet to the outlet of the bed. It is believed the maximum benzene level is reached very early in operation and continues to decrease with time on stream. Accordingly, different parts of the bed are expected to contain different levels of benzene.

The post-treatment evaluation was completed by incipiently wetting a commercially spent absorbent with the desired post-treatment compound and placing the samples in a benchtop hood overnight to evaporate the compound. Then TCLP benzene analysis was performed on the samples. The baseline spent sample used for this study was a commercially spent material from the bed inlet containing a high sulfur level and low benzene level (B$_1$T$_1$). This provided a reasonable manner to evaluate the efficacy for benzene removal. This is because, as discussed further below, it has been found that it is more difficult to displace low levels of benzene from material containing high levels of sulfur. The compounds evaluated for post-treatment included benzaldehyde, benzyl alcohol, diethyl ether, methanol and water. Water as a liquid and water as a gas are used according to multiple embodiments, both as pre-treatment and post-treatment. Water as a liquid may be applied by spraying, and as a gas may be applied with a carrier gas. In some embodiments, nitrogen is one of several suitable carrier gases for water and other agents described herein. Table 3 shows results for liquid phase post-treatment for TCLP benzene and % S retained by the absorbent from the commercially spent sample:

TABLE 3

| Sample | Loading, wt % | TCLP benzene, mg/L leachate | % S retained |
|---|---|---|---|
| Untreated | N/A | 1.06 | 100 |
| Benzaldehyde | 47 | 0.03 | 92.3 |
| Methanol | 45 | 0.55 | 94.9 |
| Water | 48 | 0.43 | 99.8 |
| Benzyl alcohol | 41 | 0.41 | 89.5 |
| Diethyl ether | 50 | 0.50 | 92.0 |

While not expected based on any reports in the literature of which applicant is aware, a reaction between the spent absorbent and benzaldehyde during this post-treatment evaluation was observed, which led to identification of several agents according to the present embodiments, including benzaldehyde as pre-treatment for lowering benzene levels on spent absorbents. When the sulfur level on the spent absorbent was high (conversely, benzene level is low), no significant visual change occurred upon the spent material post-treated with benzaldehyde. By comparison, when the sulfur level on the spent absorbent was low (conversely, benzene is high) a noticeable visual change in the absorbent occurred, in that blue crystalline structures began to form on and throughout the absorbent, along with shards of white crystals. The blue crystals were most likely a result of copper migration induced by the benzaldehyde, as it becomes oxidized to benzoic acid over the absorbent. Images taken with an optical microscope showed an untreated spent absorbent, a spent absorbent with low sulfur (high benzene) that was post-treated with benzaldehyde, and a spent absorbent with high sulfur (low benzene) post-treated with an equal amount of benzaldehyde at the same conditions. The low sulfur-high benzene, benzaldehyde-treated absorbent showed white crystals formed on the edges and throughout the particle. The referenced images are reproduced in the FIGS. 3-5, with FIG. 3 representing untreated absorbent, FIG. 4 representing low-sulfur high benzene absorbent treated with benzadehyde, and FIG. 5 representing high sulfur-low benzene absorbent treated with benzaldehyde.

Figure 3:
FIG. 3 is a photograph of an untreated absorbent after exposure to a stream of natural gas containing hydrocarbons including aromatics, and sulfur compounds.
Figure 4:
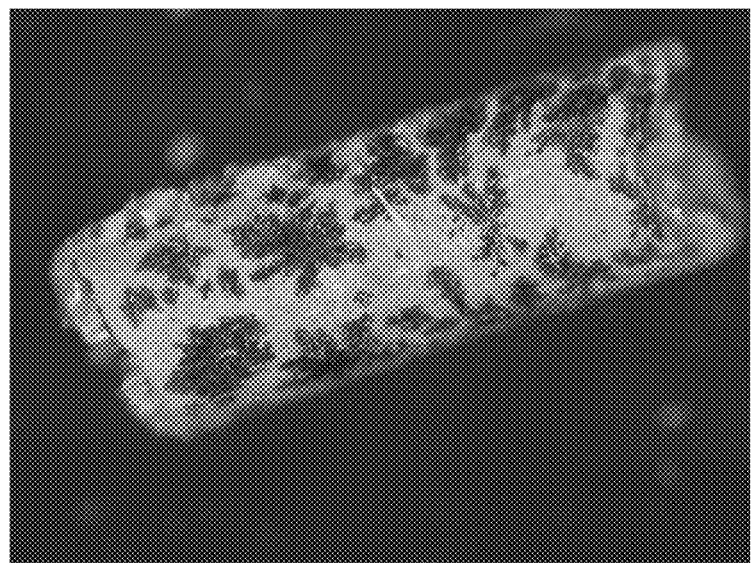
FIG. 4 is a photograph of an absorbent exposed to the same stream of natural gas as the absorbent of FIG. 3 and treated with benzaldehyde.
Figure 5:
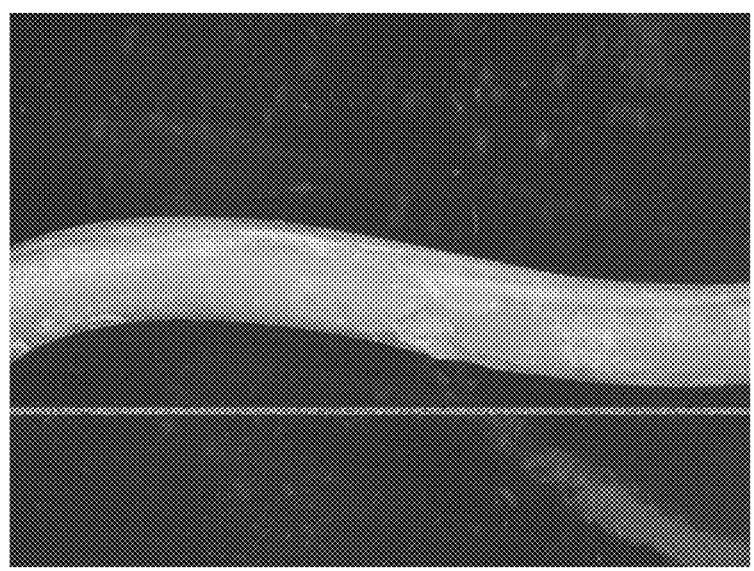
FIG. 5 is a photograph of an absorbent exposed to the same stream of natural gas as the absorbents in FIG. 3 and FIG. 4, again following treatment with benzaldehyde. The absorbent in FIG. 5 is from a different part of the absorbent bed, further upstream and closer to the inlet, compared to the absorbent in FIG. 4.

The images in FIGS. 3-5 and the data herein indicate that the Cu—S bonds are too strong to be broken by the benzaldehyde. By comparison, however, the π-complexation between copper and benzene is much weaker and able to be broken by the interaction with benzaldehyde. Additionally, the "free" copper (copper not bound to sulfur) in the spent absorbent likely catalyzes the oxidation of benzaldehyde to benzoic acid. For example, present embodiments are suitable to be practiced upon commercially available zeolite absorbents used for desulfurization of natural gas. Copper Y-zeolites are such an absorbent, and the material of the absorbent bed for the testing described herein was made up of such zeolites containing approximately 7-13% copper, and in some cases about 10% copper.

It also was deduced that free copper migrating upon the absorbent coalesces at different places along the structure, preventing further absorption by the absorbent. This further explains the mixed results of benzaldehyde as a pre-treatment. The benzaldehyde reacted with copper on the fresh absorbent, moving the copper out of the cages and preventing the absorption of sulfur. This is different, however, from the loss of sulfur capacity due to pre-treatment with benzyl alcohol. Benzyl alcohol has a boiling point of 205° C., allowing it to remain as a liquid in the absorbent pores and prevent absorption. Thus, at ambient temperatures the loss of sulfur capacity due to pre-treatment with benzyl alcohol results primarily from physical obstruction.

Additionally, no evidence of the kind of reaction with benzaldehyde was seen from pre- or post-treatment with benzyl alcohol. This was confirmed by post-treatment with the four-carbon chain analogues: butyraldehyde, butanol and butyric acid. Butyraldehyde and butanol showed similar results to their six-member ring counterparts, where the aldehyde caused significant agglomeration of copper and the alcohol showed no impact. Surprisingly, there was no significant agglomeration of copper that occurred with the treatment of the carboxylic acid (butyric acid). This indicates that it is the actual oxidation of the aldehyde that frees the copper and allows it to agglomerate, and not just dissolution and re-deposition of the copper by the carboxylic acid. At concentrations beyond those claimed here, benzaldehyde may have limitations as a pre-treatment or post-treatment agent because it has the potential to cause several issues if it converts to benzoic acid: corrosion, plugging, and potential downstream poisoning. When benzaldehyde is to be used as a treatment agent at the end of absorbent life, however, these factors are less of a consideration. Further, the data and observations with benzaldehyde also help to inform the mechanisms that influence other post-treatment strategies as discussed herein.

Now concerning post-treatment with water, both liquid water and vapor phase water were included in testing. The data here showed that benzene is more easily removed from the absorbents when the benzene level is high and the sulfur level is low (middle of bed, $B_3T_1$) with as little as 1.5% $H_2O$ in $N_2$ at ambient temperature (~50% water saturation), as Table 4 shows:

TABLE 4

| Sample | TCLP benzene, mg/L | % S |
|---|---|---|
| B1T1 Untreated | 1.06 | 3.9 |
| B1T1 1.5% $H_2O$ in $N_2$ | 0.97 | 4.0 |
| B1T1 Liquid $H_2O$ | 0.43 | 3.7 |
| B3T1 Untreated | 14.3 | <0.01 |
| B3T1 1.5% H2O in $N_2$ | 0.02 | — |
| B3T1 3% $H_2O$ in $N_2$ | <0.01 | — |

By comparison, benzene is more difficult to remove when the sulfur level is high and the benzene level is low (inlet of bed, $B_1T_1$) with only 50% water saturated gas. This is because the adsorbed sulfur inhibits the access of the water molecules to the sites where benzene tends to be located. Higher levels of water saturation (~100%) will be required to lower the benzene level when the sulfur level is high.

It should be noted, however, that the environmental standards discussed herein consider the bed as a whole rather than in particular segments of the bed. Therefore, heavily sulfur saturated portions of a bed might remain close to limits for acceptable TCLP benzene levels, yet the overall bed will test well within TCLP limits. Stated differently, even without removing the majority of the benzene at the inlet of the bed, water vapor will lower the overall benzene level for the entire bed below the EPA limit of 0.5 mg/L leachate. Thus, the data obtained from these studies shows that post-treatment with water in either liquid or vapor phase is able to accomplish sufficient benzene reduction to satisfy limits for disposal of sulfur absorbents as non-hazardous waste. Water saturated gas can be used to lower benzene levels below TCLP requirement if liquid water cannot be used or is impractical.

It will be understood that the embodiments described herein are not limited in their application to the details of the teachings and descriptions set forth, or as illustrated in the accompanying figures. Rather, it will be understood that the present embodiments and alternatives, as described and claimed herein, are capable of being practiced or carried out in various ways. Also, it is to be understood that words and phrases used herein are for the purpose of description and should not be regarded as limiting. The use herein of such words and phrases as "including," "such as," "comprising," "e.g.," "containing," or "having" and variations of those words is meant to encompass the items listed thereafter, and equivalents of those, as well as additional items.

Accordingly, the foregoing descriptions of embodiments and alternatives are meant to illustrate, rather than to serve as limits on the scope of what has been disclosed herein. The descriptions herein are not meant to limit the understanding of the embodiments to the precise forms disclosed. It will be understood by those having ordinary skill in the art that modifications and variations of these embodiments are reasonably possible in light of the above teachings and descriptions.

What is claimed is:

1. A method to lower benzene levels in absorbents that are used for desulfurization of a gas flow in a reactor having an inlet and an outlet, comprising:
applying at least one agent to the absorbents, wherein the absorbents are aluminosilicate zeolites having a structure that contains at least one metal; and
displacing benzene with the at least one agent that reacts with the at least one metal;
wherein the at least one agent is water, and
the weight percentage of water is about 1% to about 60%.

2. The method of claim 1, wherein the weight percentage of water is about 10% to about 50%.

3. The method of claim 1, wherein the at least one metal is copper.

4. The method of claim 3 wherein applying at least one agent to the absorbents comprises exposing the absorbents to a hydrated gas stream.

5. The method of claim 4, wherein the method is performed at a temperature no greater than about 100° C.

6. A method to lower benzene levels in absorbents that are used for desulfurization of a gas flow in a reactor having an inlet and an outlet, comprising:
applying at least one agent to the absorbents, wherein the absorbents are aluminosilicate zeolites having a structure that contains at least one metal; and
displacing benzene with the at least one agent that reacts with the at least one metal;
wherein the at least one agent is chosen from the group benzyl alcohol, benzaldehyde, methanol, and diethyl ether.

7. The method of claim 6, wherein the at least one agent is benzyl alcohol, and the weight percentage of benzyl alcohol is about 1% to about 60%.

8. The method of claim 7, wherein the weight percentage of benzyl alcohol is about 10% to about 50%.

9. The method of claim 6, wherein the at least one metal is copper.

10. The method of claim 9, wherein applying at least one agent to the absorbents comprises exposing the absorbents to a hydrated gas stream.

11. The method of claim 6, wherein the weight percentage of the at least one agent is about 30% to about 60%.

12. The method of claim 11, wherein applying at least one agent to the absorbents comprises exposing the absorbents to a hydrated gas stream.

13. The method of claim 12, wherein the method is performed at a temperature no greater than about 100° C.

14. A method to lower benzene levels in absorbents that are used for desulfurization of a gas flow in a reactor having an inlet and an outlet, comprising:
- applying at least one agent to the absorbents prior to or after installation of the absorbents in a reactor but before use, wherein the absorbents are aluminosilicate zeolites having a structure that contains at least one metal;
- then lowering the amount of benzene that interacts chemically with the at least one metal when the at least one agent reacts with the at least one metal,
- wherein the at least one agent is chosen from the group water, benzyl alcohol, benzaldehyde, and diethyl ether, and
- the weight percentage of the at least one agent is about 30% to about 60%.

15. The method of claim 14, wherein the weight percentage of the at least one agent is about 40% to about 50%.

16. The method of claim 14, wherein the at least one metal is copper.

17. The method of claim 14, wherein the at least one agent is water, and applying at least one agent to the absorbents comprises exposing the absorbents to a hydrated gas stream.

* * * * *